United States Patent [19]

Hansen et al.

[11] 4,379,857

[45] Apr. 12, 1983

[54] INSULATION COMPOSITION

[75] Inventors: Douglas E. Hansen, Kansas City, Mo.; Steven D. Johnson, Prairie Village, Kans.; Richard L. Motko, Kansas City, Mo.

[73] Assignee: Cook Paint and Varnish Company, Kansas City, Mo.

[21] Appl. No.: 316,041

[22] Filed: Oct. 28, 1981

[51] Int. Cl.$^3$ ................................................ C08J 9/22
[52] U.S. Cl. ...................................... 521/54; 521/55; 521/78; 521/79; 521/81
[58] Field of Search ..................................... 521/54, 55

[56] References Cited

U.S. PATENT DOCUMENTS

| | | | |
|---|---|---|---|
| 3,104,196 | 9/1963 | Shannon | 521/55 |
| 3,711,431 | 1/1973 | Vargiu et al. | 521/55 |
| 3,733,285 | 5/1973 | Steffy | 521/54 |
| 3,764,357 | 10/1973 | Bowles et al. | 521/55 |
| 3,869,295 | 3/1975 | Bowles et al. | 521/55 |
| 3,899,455 | 8/1975 | Unterstenhoefer et al. | 521/54 |
| 4,245,054 | 1/1981 | Hohwiller | 521/55 |
| 4,247,649 | 1/1981 | Damiens | 521/54 |
| 4,303,768 | 12/1981 | Blount | 525/479 |

*Primary Examiner*—Morton Foelak
*Attorney, Agent, or Firm*—Cushman, Darby & Cushman

[57] ABSTRACT

An insulating composition comprising in combination a liquid binder, a heat expanded polystyrene material in bead or granular form and a reinforcing pigment, said liquid binder comprising a 95.5 to 50:50 mixture, by weight of an acrylic or vinyl polymer emulsion and an alkali metal silicate, said expanded polystyrene being present in an amount ranging from 5 to 25 percent by weight of said composition.

14 Claims, No Drawings

INSULATION COMPOSITION

BACKGROUND OF THE INVENTION

Insulating and building materials which contain expanded polystyrene beads or granules bonded together by means of a polymeric binder are known. It has been observed, however, that conventional insulating materials of this type suffer one or more disadvantages when employed to produce a fire resistant and/or flame retardant coating. More particularly it has been found that the resulting coatings lack structural integrity when exposed to heat or flame and often lack sufficient fire retardant characteristics unless specific known fire retardants are added thereto.

SUMMARY OF THE INVENTION

The present invention overcomes the disadvantages of known insulating material containing expanded polystyrene beads or granules in that a coating produced from the insulating material of this invention exhibits good toughness, heat resistance, flame retardance and retention of structure upon exposure to flame.

More particularly, an object of the present invention is to provide an insulating composition suitable for use as a covering for storage tanks, boilers, steam pipes, heated walls or other surfaces and all other equipment, apparatus or structures of a similar character. The covering produced from the insulating composition of this invention is strong, relatively light weight, and heat and fire resistant and is economical to manufacture, convenient to apply and efficient in use.

The thermal insulating composition of this invention comprises in combination a liquid binder, a heat expanded plastic material in bead or granular form and optionally a reinforcing pigment, said liquid binder comprising a mixture of an organic polymer and a silicate.

DETAILED DESCRIPTION OF THE INVENTION

The insulating composition of the present invention comprises an admixture, preferably a dispersion, in a liquid binder, of heat expanded plastic granules or beads, preferably, expanded polystyrene granules, and optionally a reinforcing pigment, the liquid binder being a mixture of an organic polymer emulsion and a silicate.

The expanded polystyrene granules can be derived from a thermally-expandable polystyrene composition containing, in addition to polystyrene, a volatile liquid such as a mixture of pentanes, for example. The composition can be heated to 100° C. or to a temperature of that order to effect expansion. Generally, it is convenient to use expanded polystyrene granules with diameters of 0.1 mm to 10 mm or more. The expanded polystyrene granules may be of any of a wide variety of shapes.

Heat expanded materials, such as vermiculite and perlite, if treated to eliminate or substantially reduce their moisture absorption characteristics, such as by treatment with a silicone or similar agent, can be employed although expanded polystyrene granules or beads are preferred.

The heat expanded plastic material, for example, expanded polystyrene granules, is present in the insulating composition of this invention is an amount ranging from about 2 to 25, and preferably about 6 to 12 percent by weight, based on the total weight of said composition.

The reinforcing pigment, when employed in the composition of the present invention, is mica, natural or synthetic, including for instance, such materials as phlogopite, biotite and fluorophlogopite as well as other known or commercially available micas. In addition to reinforcing the coating resulting from the use of the composition of the present invention, the mica may also function as a heat reflector. The mica employed in the insulating composition of this invention is generally in flake form although other conventional particulate forms can be utilized. Generally, its size ranges from about 10 to 60 mesh (U.S. screen) and it is provided in an amount ranging from about 0 to 25, and preferably from about 8 to 15, percent by weight based on the total weight of the insulating composition. Moreover, reinforcing pigments or agents such as glass flakes, plastic flakes, asbestos and the like can be utilized as an alternative or in combination with mica as the reinforcing pigment, although the latter is preferred.

Conventional fire retardant agents can also be included, if desired, in the insulating composition of the present invention. They can generally be provided in an amount ranging from about 0 to 20, and preferably from about 5 to 10 percent by weight based on the total weight of the composition. Particularly suitable fire retardant agents include chlorinated paraffin having a chlorine content of about 70%, or antimony trioxide, or a mixture thereof.

The insulating composition of the present invention can also advantageously include a coalescing solvent/freeze-thaw additive such as, for instance, a polyhydric alcohol including ethylene glycol or propylene glycol. This adjuvant is generally provided in an amount ranging from about 0 to 12, preferably about 1 to 5 percent by weight of the insulating composition of this invention.

The liquid binder employed in the insulating composition of the present invention is a mixture of an organic polymer emulsion and an alkali silicate.

The organic polymer emulsion can be an acrylic emulsion, a polyvinyl acetate emulsion, a polyvinylidene chloride emulsion or a styrene-butadiene latex.

Preferably, an acrylic emulsion produced in accordance with conventional emulsion polymerization techniques is utilized. Thus, there can be employed acrylic copolymer and acrylic terpolymer emulsions produced from (1) acrylic or methacrylic acid, or a mixture thereof and/or (2) at least one alkyl ester of acrylic or methacrylic acid, especially the lower alkyl esters thereof, for instance, methyl, ethyl or butyl acrylate and methyl methacrylate, or mixtures of two or more of these monomers, and (3) if desired, one or more other functional monomers such as vinyl chloride, vinyl acetate or styrene and the like. Conveniently, an acrylic terpolymer which contains butylacrylate, vinyl chloride and vinyl acetate is utilized.

The organic polymer emulsion is present in the binder component of the insulating composition of this invention in an amount ranging from 5 to 95, preferably 20 to 50, percent by weight based on the total weight of the binder component.

When an acrylic terpolymer emulsion is employed the acrylic terpolymer solids represent an amount of about 70% by weight of the binder component solids.

The binder component of the insulating composition of this invention as noted above must also contain an alkali silicate, preferably, potassium silicate although other alkali silicates such as sodium silicate, lithium silicate and quaternary ammonium silicate can be employed. It has been observed that the presence of, for instance, potassium silicate in the binder component significantly improves the toughness, heat resistance, flame retardance and retention of structure, or structural integrity, of the insulating composition of this invention when exposed to flame.

For instance, tests have shown that an insulating composition made in accordance with the present invention except that the binder component contained no potassium silicate, became soft in the temperature range of 150°–160° F. On the other hand, the presence of potassium silicate in the binder component kept the coating firm at temperatures up to 200° F. and higher. It has also been noted in other tests that with a non-potassium silicate containing binder in a composition otherwise produced in accordance with the present invention, the resulting coating composition readily burned, even with conventional fire retardants admixed therein; whereas a coating composition made in accordance with this invention exhibits an acceptable degree of flame resistance even in the absence of specific fire retardant additives. Further, it has been noted that when exposed to flame, such a potassium silicate-free insulating composition tends to flow off the coated substrate or structure; whereas one containing potassium silicate permits the insulation coating to retain its shape even when the organic constituents therein char or burn out.

The alkali silicate is generally present in the liquid binder component of the insulation composition of this invention in an amount ranging from 5 to 50, preferably 5 to 15, percent by weight, based on the total weight of the liquid binder. Optimally, the alkali silicate represents about 15 percent of the solid weight of the binder component.

The liquid binder component normally is present in an amount of about 75 to 95, and preferably about 88 to 92 percent based on the total weight of the insulating composition.

Conventional application techniques can be employed for coating a substrate with the insulation composition of this invention including spraying, brushing, roller coating, dipping, etc. Preferably, the insulating composition is sprayed onto the substrate.

If desired, the insulating coating produced from the composition of this invention can be top-coated with a conventional elastomer latex such as elastomeric acrylic or polyvinylide chloride emulsions.

The following non-limiting examples are given to illustrate the present invention.

EXAMPLE 1

An insulating composition was prepared by admixing the following components on a high speed mixer.

|  | Amount (lbs) |
|---|---|
| Water | 16 |
| Polyvinyl acetate emulsion* | 377 |
| Potassium silicate, (29.8% Be, SiO$_2$/K$_2$O, 2.5/1) | 103 |
| Dispersant | 6 |
| Melamine crystals | 58 |
| Dipentaerythritol | 55 |
| Preservative | 1 |
| Defoamer | 7 |
| Coalescing Solvent | 2 |

-continued

|  | Amount (lbs) |
|---|---|
| Chlorinated paraffin 70% Cl | 26 |
| Polymeric nitrogenous phosphate | 170 |
| 60 mesh mica | 79 |

*This is a commercially available vinyl acetate polymer emulsion having the following properties:
| | |
|---|---|
| Percent Non-volatiles | 55% |
| Viscosity (Poise) | 5.5 |
| Wt./Gal., Lbs. | 9.10 |
| Particle Size (Avg.) | 0.43 Micron |
| pH | 4.0–5.0 |
| Minimum Film Forming Temperature | 47° F. |

Thereafter, 100 lbs of expanded polystyrene beads were added and mixed under slow agitation.

The resulting stiff paste mixture was applied by trowel to a surface to be insulated, forming a rigid insulation. When exposed to flame, an intumescent char developed.

EXAMPLE 2

An insulating composition was prepared by dispersing the following components on a high speed disperser.

|  | Amount (lbs) |
|---|---|
| Water | 364 |
| Potassium silicate, (29.8° Be, SiO$_2$/K$_2$O 2.5/1) | 93 |
| Antimony trioxide | 38 |
| Modified Clay | 14 |
| Acrylic terpolymer emulsion* | 218 |
| Defoamer | 1 |
| Coalescing solvent | 7 |
| Ethylene glycol | 14 |
| Preservative | 2 |
| Chlorinated paraffin, 70% Cl | 37 |
| 20 mesh mica | 102 |

*This is a commercially available acrylic terpolymer emulsion having the following properties:
| | |
|---|---|
| Percent Non-volatiles | 58% |
| Viscosity (Poise) | 10.0 |
| Wt./Gal., Lbs. | 9.2 |
| Particle Size (Avg.) | 0.4 Micron |
| pH | 5.5 |
| Minimum Film Form Temperature | 54° F. |

Thereafter 110 lbs of expanded polystyrene beads were slowly dispersed therein.

The resulting stiff mixture which was applied by trowel or by spray equipment to a surface to be insulated, dried within several hours in quarter inch thicknesses, and yielded a K-factor of 0.31.

EXAMPLE 3

An insulating composition was prepared by admixing the following components on a high speed mixer. Specific fire retardants were omitted.

|  | Amount (lbs) |
|---|---|
| Water | 359 |
| Potassium silicate, (29.8° Be, SiO$_2$/K$_2$O 2.5/1) | 92 |
| Modified clay | 14 |
| Calcium carbonate | 80 |
| Acrylic copolymer emulsion* | 218 |
| Defoamer | 1 |
| Coalescing solvent | 8 |
| Ethylene glycol | 14 |
| Preservative | 2 |

| | Amount (lbs) |
|---|---|
| 20 mesh mica | 102 |

*This is a commercially available acrylic copolymer emulsion having the following properties:

| | |
|---|---|
| Percent Non-volatiles | 50% |
| Viscosity (Poise) | 11 |
| Wt./Gal., Lbs. | 8.8 |
| pH | 9.5 |
| Minimum Film Forming Temperature | 50° F. |

Thereafter 110 lbs of expanded polystyrene beads were dispersed therein.

When formed into a dried rigid insulation layer, and exposed to flame in an inclined panel test, the insulation charred, but retained its shape.

EXAMPLE 4

An insulating composition utilizing surface-treated expanded perlite was prepared by dispersing the following components on a high speed mixer.

| | Amount (lbs) |
|---|---|
| Water | 411 |
| Potassium silicate, (29.8° Be, $SiO_2/K_2O$ 2.5/1) | 85 |
| Antimony trioxide | 35 |
| Modified clay | 13 |
| Acrylic terpolymer emulsion* | 200 |
| Defoamer | 1 |
| Coalescing solvent | 7 |
| Ethylene glycol | 12 |
| Preservative | 2 |
| 20 mesh mica | 34 |

*This is a commercially available acrylic terpolymer emulsion having the following properties:

| | |
|---|---|
| Percent Non-volatiles | 58% |
| Viscosity (Poise) | 10.0 |
| Wt./Gal., Lbs. | 9.2 |
| Particle Size | 0.4 Micron |
| pH | 5.5 |
| Minimum Film Forming Temperature | 54° F. |

Thereafter 200 lbs. of silicone treated, expanded perlite were slowly blended therewith.

This composition was much heavier in consistency than those made with polystyrene beads, but it did cure into a rigid insulation layer.

EXAMPLE 5

An insulation composition was prepared using an elastomeric polyvinylidene chloride emulsion for increased flexibility and toughness by dispersing the following components on a high speed mixer.

| | Amount (lbs) |
|---|---|
| Water | 364 |
| Sodium silicate, (41.0° Be, $SiO_2/Na_2O$ 3.22/1) | 93 |
| Antimony trioxide | 38 |
| Modified clay | 14 |
| Polyvinylidene chloride emulsion* | 218 |
| Defoamer | 1 |
| Coalescing solvent | 8 |
| Ethylene glycol | 14 |
| Preservative | 2 |
| Chlorinated paraffin, 70% Cl | 36 |
| 20 mesh mica | 102 |

*This is a commercially available vinylidine chloride copolymer emulsion having the following properties:

| | |
|---|---|
| Percent Non-volatiles | 55% |
| Viscosity (Poise) | 11 |
| Particle Size (Microns) | 0.3 |
| Wt./Gal., Lbs. | 9.6 |
| pH | 5.5–7.0 |
| Minimum Film Forming Temperature | 40° F. |

Thereafter 110 lbs of expanded polystyrene beads were slowly blended therewith.

What is claimed is:

1. An insulating composition comprising in combination a liquid binder, a heat expanded polystyrene material in bead or granular form and a reinforcing pigment, said liquid binder comprising a 95:5 to 50:50 mixture, by weight of an acrylic or vinyl polymer emulsion and an alkali metal silicate, said expanded polystyrene being present in an amount ranging from 5 to 25 percent by weight of said composition.

2. The insulating composition of claim 1 wherein said reinforcing pigment is present in an amount ranging from 0 to 25 percent by weight of said composition.

3. The insulating composition of claim 1 wherein said silicate is selected from potassium silicate, sodium silicate or lithium silicate.

4. The insulating composition of claim 1 wherein said polymer emulsion is a polyvinyl acetate emulsion, an acrylic terpolymer emulsion, an acrylic copolymer emulsion or a polyvinylidene chloride emulsion.

5. The insulating composition of claim 1 wherein said polymer emulsion is an acrylic terpolymer emulsion and said silicate is potassium silicate.

6. The insulating composition of claim 7 wherein the acrylic terpolymer solids represent an amount of about 70% by weight of the binder component solids.

7. The insulating composition of claim 1 wherein said polymer emulsion is polyvinylidene chloride emulsion and said silicate is sodium silicate.

8. The insulating composition of claim 1 wherein said reinforcing pigment is selected from mica, glass flakes, plastic flakes and asbestos.

9. The insulating composition of claim 8 wherein said reinforcing pigment is mica.

10. A sprayable insulating composition comprising a dispersion in a liquid binder of expanded polystyrene granules and a reinforcing pigment, said liquid binder comprising a 95:5 to 50:50 mixture, by weight, of an acrylic or vinyl polymer emulsion and an alkali metal silicate, said polystyrene granules being present in an amount ranging from 2 to 25 percent by weight of said composition and said reinforcing pigment being present in an amount ranging from 0 to 25 percent by weight of said composition.

11. The sprayable insulating composition of claim 10 which also includes about 0 to 20 percent by weight based on the total weight of said composition of a fire retardant agent.

12. The sprayable insulating composition of claim 10 which also includes an effective amount of a coalescing solvent/freeze-thaw additive.

13. The sprayable insulating composition of claim 12 wherein said additive is present in an amount ranging from about 0 to 12 percent by weight of said composition.

14. A sprayable insulating composition comprising a dispersion in a liquid binder of expanded polystyrene granules and a reinforcing pigment, said liquid binder comprising a 95:5 to 50:50 mixture, by weight, of an acrylic terpolymer emulsion and potassium silicate, said expanded polystyrene granules being present in an amount ranging from 5 to 25 percent by weight of said composition, said reinforcing pigment being mica having a size ranging from 10 to 60 mesh and being present in an amount ranging from 0 to 25 percent based on the weight of said composition, said composition also including one or more of an effective amount of a fire retardant agent selected from antimony trioxide or a chlorinated paraffin and an effective amount of a coalescing solvent/freeze-thaw additive.

* * * * *